US008193253B2

United States Patent
Koyama et al.

(10) Patent No.: US 8,193,253 B2
(45) Date of Patent: Jun. 5, 2012

(54) ORGANOSOL OF FLUORIDE COLLOID PARTICLE AND METHOD FOR PRODUCING THE SAME

(75) Inventors: Yoshinari Koyama, Sodegaura (JP); Motoko Asada, Sodegaura (JP); Osamu Fujimoto, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 314 days.

(21) Appl. No.: 12/311,906

(22) PCT Filed: Oct. 16, 2007

(86) PCT No.: PCT/JP2007/070157
§ 371 (c)(1),
(2), (4) Date: Apr. 17, 2009

(87) PCT Pub. No.: WO2008/047787
PCT Pub. Date: Apr. 24, 2008

(65) Prior Publication Data
US 2009/0281200 A1    Nov. 12, 2009

(30) Foreign Application Priority Data
Oct. 20, 2006    (JP) .................................. 2006-286004

(51) Int. Cl.
B01F 3/12 (2006.01)
B01D 12/00 (2006.01)
C09C 3/08 (2006.01)
C09C 1/02 (2006.01)
C01F 5/28 (2006.01)
G02B 1/11 (2006.01)

(52) U.S. Cl. ................ 516/33; 106/287.27; 106/287.29; 427/220; 428/403; 977/773; 977/834

(58) Field of Classification Search .................... 516/33; 106/287.29; 428/403; 427/220; 359/580; 252/582; 977/834, 773
See application file for complete search history.

(56) References Cited

U.S. PATENT DOCUMENTS

| | | | | |
|---|---|---|---|---|
| 3,630,952 A | * | 12/1971 | Nielsen | 516/33 |
| 4,191,580 A | * | 3/1980 | Beiter et al. | 106/16 |
| 4,714,596 A | * | 12/1987 | Floreancig | 422/10 |
| 4,975,328 A | * | 12/1990 | Hirose et al. | 428/413 |
| 5,552,083 A | | 9/1996 | Watanabe et al. | |
| 5,667,725 A | | 9/1997 | Watanabe et al. | |
| 5,847,795 A | * | 12/1998 | Satoh et al. | 349/137 |
| 5,891,565 A | | 4/1999 | Watanabe et al. | |
| 6,291,535 B1 | | 9/2001 | Watanabe et al. | |
| 6,713,170 B1 | | 3/2004 | Kaneko et al. | |
| 2001/0053461 A1 | * | 12/2001 | Ogawa et al. | 428/690 |
| 2006/0124598 A1 | * | 6/2006 | Bessoles et al. | 216/98 |
| 2006/0151070 A1 | * | 7/2006 | Rodzewich et al. | 148/247 |
| 2006/0165918 A1 | * | 7/2006 | Ito | 428/1.31 |

FOREIGN PATENT DOCUMENTS

| | | | |
|---|---|---|---|
| JP | 57-168954 A | * | 10/1982 |
| JP | A-2-026824 | | 1/1990 |
| JP | A-3-293027 | | 12/1991 |
| JP | 04-013780 A | * | 1/1992 |
| JP | A-4-243902 | | 9/1992 |
| JP | A-7-069620 | | 3/1995 |
| JP | A-7-069621 | | 3/1995 |
| JP | A-2000-169133 | | 6/2000 |
| JP | 2007-161509 A | * | 6/2007 |
| WO | WO 00/34396 A1 | | 6/2000 |

OTHER PUBLICATIONS

Derwent Abstract, week 198414, London: Derwent Publications Ltd., AN 1982-01244J, JP 57-168954 A, (Okayama-Ken), abstract.*
Derwent Abstract, week 199209, London: Derwent Publications Ltd., AN 1992-069544, JP 04-013780 A, (Shikoku Chem Ind Co Ltd), abstract.*
Machine Translation of Publ. No. JP 2007-161509, published Jun. 28, 2007, Japan patent Office, Tokyo, Japan, obtained online @ http://www19.ipdl.inpit.go.jp/PA1/cgi-bin/PA1INDEX (Downloaded Mar. 28, 2011).*

* cited by examiner

Primary Examiner — Daniel S Metzmaier
(74) Attorney, Agent, or Firm — Oliff & Berridge, PLC

(57) ABSTRACT

There is provided an organosol of surface-modified fluoride colloid particles obtained by coating the surface of a fluoride colloid particle as a core with an organophosphorus compound and a method for producing the organosol. An organosol of a surface-modified fluoride colloid particle comprising: a fluoride colloid particle as a core; and at least one type of an organophosphorus compound selected from a group consisting of organophosphorus compounds represented by the following general formula (1), (2), and (3):

$$(R-O)_nP(=O)(OM)_{3-n} \quad (1)$$

$$(R-O)_nP(OM)_{3-n} \quad (2)$$

$$(R)_nP(=O)(OM)_{3-n} \quad (3)$$

where R represents a substituted or unsubstituted alkyl group, alkenyl group or aryl group, M represents a hydrogen atom, an alkali metal or $NZ_4$ (Z represents a hydrogen atom or an alkyl group); and n represents an integer of 1 or 2, the organophosphorus compound coating a surface of the fluoride colloid particle.

6 Claims, No Drawings

ORGANOSOL OF FLUORIDE COLLOID PARTICLE AND METHOD FOR PRODUCING THE SAME

TECHNICAL FIELD

The present invention relates to an organosol of surface-modified fluoride colloid particles obtained by coating the surface of a fluoride colloid particle as a core with an organophosphorus compound and a method for producing the organosol.

BACKGROUND ART

Typically, an antireflection treatment is applied to a lens, cathode ray, or the image display surface of a liquid crystal display device to reduce the reflection of ambient light such as sunlight or electric light, and to enhance light transmission. For the antireflection treatment, a method for evaporating magnesium fluoride, which is a low refractive index substance, by a vacuum evaporation method, has been widely used. However, in accordance with an increase in the size of displays, a coating method that is excellent in productivity has become used instead of an evaporation method with low operating efficiency and high cost.

In a coating method, colloid particles with a low refractive index, such as magnesium fluoride, are effective as a microfiller.

A water-based sol and an organosol, which is obtained by substituting the water-based sol with an organic solvent, are known as sols of colloid particles of magnesium fluoride (Patent Documents 1 and 2). However, since the surface of magnesium fluoride particles of these sols has high hydrophilicity, while a sol in which a disperse medium is a hydrophilic organic solvent such as alcohol can be produced as an organosol, a sol dispersed in a hydrophobic organic solvent cannot be produced.

Thus, a composition for a coating material obtained by mixture with a binder component or the like is limited to a binder component having a good compatibility with a hydrophilic organic solvent. Therefore, difficulty in producing a coating material composition using a hydrophobic organic solvent, has occurred.

[Patent Document 1]
    Japanese Patent Application Publication No. JP-A-7-69621
[Patent Document 2]
    Japanese Patent Application Publication No. JP-A-2-26824

DISCLOSURE OF THE INVENTION

Problem to be Solved by the Invention

It is an object of the present invention to provide an organosol of fluoride colloid particles having excellent dispersibility in a hydrophobic organic solvent.

Means for Solving the Problem

The present invention provides, according to a first aspect, an organosol of a surface-modified fluoride colloid particle including: a fluoride colloid particle as a core; and at least one type of an organophosphorus compound selected from a group consisting of organophosphorus compounds represented by the following general formulae (1), (2), and (3):

where R represents a substituted or unsubstituted alkyl group, a substituted or unsubstituted alkenyl group, or a substituted or unsubstituted aryl group, having 1 to 22 carbon atom; M represents a hydrogen atom, an alkali metal, or $NZ_4$ (Z represents a hydrogen atom or an alkyl group having 1 to 5 carbon atom); and n represents an integer of 1 or 2, the organophosphorus compound coating a surface of the fluoride colloid particle;

according to a second aspect, in the organosol of a fluoride colloid particle according to the first aspect, the organophosphorus compound is phenylphosphonic acid, phenylphosphinic acid, or an alkali metal salt or an ammonium salt of the phenylphosphonic acid or the phenylphosphinic acid;

according to a third aspect, in the organosol of a fluoride colloid particle according to the first aspect or the second aspect, a coating amount of the organophosphorus compound is 0.1 to 50% by mass based on a mass of the fluoride colloid particle;

according to a fourth aspect, in the organosol of a fluoride colloid particle according to any one of the first aspect to the third aspect, the fluoride colloid particle is magnesium fluoride, sodium magnesium fluoride, or a hydrate salt of the magnesium fluoride or the sodium magnesium fluoride;

according to a fifth aspect, in the organosol of a fluoride colloid particle according to any one of the first aspect to the fourth aspect, the organic solvent is a hydrophobic organic solvent;

according to a sixth aspect, a method for producing the organosol of a fluoride colloid particle as described in any one of the first aspect to the fifth aspect, the method including mixing a sol of a fluoride colloid particle with an organophosphorus compound; and according to a seventh aspect, the method for producing an organosol of a fluoride colloid particle according to the sixth aspect, the method also including the following steps of (a), (b), and (c):

(a) producing a water-based sol of a fluoride colloid,
 (b) substituting an aqueous solvent of the water-based sol of a fluoride colloid with a hydrophilic organic solvent, and
 (c) substituting a solvent of a hydrophilic organic solvent sol of a fluoride colloid with a hydrophobic organic solvent, in which during at least one step, at least one type of an organophosphorus compound selected from a group consisting of organophosphorus compounds represented by the formulae (1), (2), and (3) is added.

Effects of the Invention

According to the present invention, an organosol of fluoride colloid particles in which fluoride colloid particles surface-treated with organophosphorus compounds are dispersed in an organic solvent can be obtained. Furthermore, as a characteristic of the present invention, an organosol of fluoride colloid particles in which fluoride colloid particles surface-modified with organophosphorus compounds are well dispersed in a hydrophobic organic solvent can be obtained.

BEST MODES FOR CARRYING OUT THE INVENTION

The present invention provides an organosol of surface-modified fluoride colloid particles obtained by coating the surface of a fluoride colloid particle as a core with an organophosphorus compound.

Hereinafter, the present invention is described in detail. Examples of the fluoride colloid particle used in the present invention include magnesium fluoride, magnesium fluoride hydrate, sodium fluoride, sodium magnesium fluoride, lithium fluoride, calcium fluoride, strontium fluoride, barium fluoride, aluminum fluoride, zinc fluoride, and zinc fluoride tetrahydrate.

For these particles, particles obtained by well-known methods can be used. For example, fluoride colloid particles obtained by a method described in Japanese Patent Application Publication No. JP-A-7-69620 or Japanese Patent Application Publication No. JP-A-7-69621 are preferably used. For example, a fluoride aqueous solution is added to an aqueous solution of a magnesium salt while stirring the solution with a disperser or the like so as to reach an F/Mg molar ratio of 1.9 to 2.0. Accordingly, aggregate slurry of colloid particles of magnesium fluoride hydrate is generated so as to produce $MgF_2$ accounting for 0.1 to 10% by mass. Subsequently, by-produced salts in the resultant aggregate slurry of colloid particles of magnesium fluoride hydrate are removed by a cleaning method using membrane filtration or the like with an ultrafilter membrane, a reverse osmosis membrane, or the like. As a result, a water-based sol of magnesium fluoride hydrate can be obtained. Fluoride colloid particles obtained by such a method have a primary particle diameter of 3 to 100 nm according to an observation through an electronic microscope.

Next, an organophosphorus compound used in the present invention is described. The organophosphorus compound used in the present invention is represented by the following general formulae:

$$(R-O)_n P(=O)(OM)_{3-n} \quad (1)$$

$$(R-O)_n P(OM)_{3-n} \quad (2)$$

$$(R)_n P(=O)(OM)_{3-n} \quad (3)$$

where R represents a substituted or unsubstituted alkyl group, alkenyl group, or aryl group having 1 to 22 carbon atom(s), preferably, 1 to 12 carbon atom(s); M represents a hydrogen atom, an alkali metal, or $NZ_4$ (Z represents a hydrogen atom or an alkyl group having 1 to 5 carbon atom(s)); and n represents an integer of 1 or 2.

Examples of the alkyl group represented by R include a methyl group, an ethyl group, an n-propyl group, an i-propyl group, a cyclopropyl group, an n-butyl group, an i-butyl group, an s-butyl group, a t-butyl group, a cyclobutyl group, a 1-methyl-cyclopropyl group, a 2-methyl-cyclopropyl group, an n-pentyl group, a 1-methyl-n-butyl group, a 2-methyl-n-butyl group, a 3-methyl-n-butyl group, a 1,1-dimethyl-n-propyl group, a 1,2-dimethyl-n-propyl group, a 2,2-dimethyl-n-propyl group, a 1-ethyl-n-propyl group, a cyclopentyl group, a 1-methyl-cyclobutyl group, a 2-methyl-cyclobutyl group, a 3-methyl-cyclobutyl group, a 1,2-dimethyl-cyclopropyl group, a 2,3-dimethyl-cyclopropyl group, a 1-ethyl-cyclopropyl group, a 2-ethyl-cyclopropyl group, an n-hexyl group, a 1-methyl-n-pentyl group, a 2-methyl-n-pentyl group, a 3-methyl-n-pentyl group, a 4-methyl-n-pentyl group, a 1,1-dimethyl-n-butyl group, a 1,2-dimethyl-n-butyl group, a 1,3-dimethyl-n-butyl group, a 2,2-dimethyl-n-butyl group, a 2,3-dimethyl-n-butyl group, a 3,3-dimethyl-n-butyl group, a 1-ethyl-n-butyl group, a 2-ethyl-n-butyl group, a 1,1,2-trimethyl-n-propyl group, a 1,2,2-trimethyl-n-propyl group, a 1-ethyl-1-methyl-n-propyl group, a 1-ethyl-2-methyl-n-propyl group, a cyclohexyl group, a 1-methyl-cyclopentyl group, a 2-methyl-cyclopentyl group, a 3-methyl-cyclopentyl group, a 1-ethyl-cyclobutyl group, a 2-ethyl-cyclobutyl group, a 3-ethyl-cyclobutyl group, a 1,2-dimethyl-cyclobutyl group, a 1,3-dimethyl-cyclobutyl group, a 2,2-dimethyl-cyclobutyl group, a 2,3-dimethyl-cyclobutyl group, a 2,4-dimethyl-cyclobutyl group, a 3,3-dimethyl-cyclobutyl group, a 1-n-propyl-cyclopropyl group, a 2-n-propyl-cyclopropyl group, a 1-i-propyl-cyclopropyl group, a 2-i-propyl-cyclopropyl group, a 1,2,2-trimethyl-cyclopropyl group, a 1,2,3-trimethyl-cyclopropyl group, a 2,2,3-trimethyl-cyclopropyl group, a 1-ethyl-2-methyl-cyclopropyl group, a 2-ethyl-1-methyl-cyclopropyl group, a 2-ethyl-2-methyl-cyclopropyl group, a 2-ethylhexyl group, and a 2-ethyl-3-methyl-cyclopropyl group.

Examples of the alkenyl group include an ethenyl group, a 1-propenyl group, a 2-propenyl group, a 1-methyl-1-ethenyl group, a 1-butenyl group, a 2-butenyl group, a 3-butenyl group, a 2-methyl-1-propenyl group, a 2-methyl-2-propenyl group, a 1-ethylethenyl group, a 1-methyl-1-propenyl group, a 1-methyl-2-propenyl group, a 1-pentenyl group, a 2-pentenyl group, a 3-pentenyl group, a 4-pentenyl group, a 1-n-propylethenyl group, a 1-methyl-1-butenyl group, a 1-methyl-2-butenyl group, a 1-methyl-3-butenyl group, a 2-ethyl-2-propenyl group, a 2-methyl-1-butenyl group, a 2-methyl-2-butenyl group, a 2-methyl-3-butenyl group, a 3-methyl-1-butenyl group, a 3-methyl-2-butenyl group, a 3-methyl-3-butenyl group, a 1,1-dimethyl-2-propenyl group, a 1-i-propylethenyl group, a 1,2-dimethyl-1-propenyl group, a 1,2-dimethyl-2-propenyl group, a 1-cyclopentenyl group, a 2-cyclopentenyl group, a 3-cyclopentenyl group, a 1-hexenyl group, a 2-hexenyl group, a 3-hexenyl group, a 4-hexenyl group, a 5-hexenyl group, a 1-methyl-1-pentenyl group, a 1-methyl-2-pentenyl group, a 1-methyl-3-pentenyl group, a 1-methyl-4-pentenyl group, a 1-n-butylethenyl group, a 2-methyl-1-pentenyl group, a 2-methyl-2-pentenyl group, a 2-methyl-3-pentenyl group, a 2-methyl-4-pentenyl group, a 2-n-propyl-2-propenyl group, a 3-methyl-1-pentenyl group, a 3-methyl-2-pentenyl group, a 3-methyl-3-pentenyl group, a 3-methyl-4-pentenyl group, a 3-ethyl-3-butenyl group, a 4-methyl-1-pentenyl group, a 4-methyl-2-pentenyl group, a 4-methyl-3-pentenyl group, a 4-methyl-4-pentenyl group, a 1,1-dimethyl-2-butenyl group, a 1,1-dimethyl-3-butenyl group, a 1,2-dimethyl-1-butenyl group, a 1,2-dimethyl-2-butenyl group, a 1,2-dimethyl-3-butenyl group, a 1-methyl-2-ethyl-2-propenyl group, a 1-s-butylethenyl group, a 1,3-dimethyl-1-butenyl group, a 1,3-dimethyl-2-butenyl group, a 1,3-dimethyl-3-butenyl group, a 1-i-butylethenyl group, a 2,2-dimethyl-3-butenyl group, a 2,3-dimethyl-1-butenyl group, a 2,3-dimethyl-2-butenyl group, a 2,3-dimethyl-3-butenyl group, a 2-i-propyl-2-propenyl group, a 3,3-dimethyl-1-butenyl group, a 1-ethyl-1-butenyl group, a 1-ethyl-2-butenyl group, a 1-ethyl-3-butenyl group, a 1-n-propyl-1-propenyl group, a 1-n-propyl-2-propenyl group, a 2-ethyl-1-butenyl group, a 2-ethyl-2-butenyl group, a 2-ethyl-3-butenyl group, a 1,1,2-trimethyl-2-propenyl group, a 1-t-butylethenyl group, a 1-methyl-1-ethyl-2-propenyl group, a 1-ethyl-2-methyl-1-propenyl group, a 1-ethyl-2-methyl-2-propenyl group, a 1-i-propyl-1-propenyl group, a 1-i-propyl-2-propenyl group, a 1-methyl-2-cyclopentenyl group, a 1-methyl-3-cyclopentenyl group, a 2-methyl-1-cyclopentenyl group, a 2-methyl-2-cyclopentenyl group, a 2-methyl-3-cyclopentenyl group, a 2-methyl-4-cyclopentenyl group, a 2-methyl-5-cyclopentenyl group, a 2-methylene-cyclopentyl group, a 3-methyl-1-cyclopentenyl group, a 3-methyl-2-cyclopentenyl group, a 3-methyl-3-cyclopentenyl group, a 3-methyl-4-cyclopentenyl group, a 3-methyl-5-cyclopentenyl group, a 3-methylene-cyclopentyl group, a 1-cyclohexenyl group, a 2-cyclohexenyl group, and a 3-cyclohexenyl group.

Examples of the aryl group include a phenyl group, an o-methylphenyl group, an m-methylphenyl group, a p-methylphenyl group, an o-chlorophenyl group, an m-chlorophenyl group, a p-chlorophenyl group, an o-fluorophenyl group, a p-fluorophenyl group, an o-methoxyphenyl group, a p-methoxyphenyl group, a p-nitrophenyl group, a p-cyanophenyl group, an α-naphthyl group, a β-naphthyl group, an o-biphenylyl group, an m-biphenylyl group, a p-biphenylyl group, a 1-anthryl group, a 2-anthryl group, a 9-anthryl group, a 1-phenanthryl group, a 2-phenanthryl group, a 3-phenanthryl group, a 4-phenanthryl group, and a 9-phenanthryl group.

Specific examples of the organophosphorus compound can include monoester and diester of phosphoric acid such as α-naphthyl phosphoric acid, phenyl phosphoric acid, diphenyl phosphoric acid, n-butyl phosphate, di-n-butyl phosphate, di(2-ethylhexyl) phosphate, isopropyl phosphate, and diisopropyl phosphate, and an alkali metal salt or an ammonium salt thereof; monoester and diester of phosphorous acid such as di-n-butyl phosphite, diethyl phosphite, and diphenyl phosphite, and an alkali metal salt or an ammonium salt thereof, phosphonic acid such as p-ethylbenzenephosphonic acid and phenylphosphonic acid, and an alkali metal salt or an ammonium salt thereof; phosphinic acid such as phenylphosphinic acid, and an alkali metal salt or an ammonium salt thereof. Among these compounds, an organophosphorus compound having an aryl group is preferable, and phosphonic acid and phosphinic acid having aryl groups, or alkali metal salts or ammonium salts thereof are more preferable.

Alkali metals used in the alkali metal salt include lithium, sodium, sodium, potassium, rubidium, and cesium. The ammonium salt can include a salt of quaternary ammonium besides a salt of ammonia. Examples of the quaternary ammonium can include tetramethylammonium, tetraethylammonium, tetrapropylammonium, tetrabutylammonium, tetrapentylammonium, monomethyl triethyl ammonium, monomethyl tripropyl ammonium, monomethyl tributyl ammonium, monomethyl tripentyl ammonium, dimethyl diethyl ammonium, dimethyl dipropyl ammonium, trimethyl ethyl ammonium, and triethyl propyl ammonium.

Next, surface coating of fluoride colloid particles with organophosphorus compounds will be described. According to the present invention, by adding organophosphorus compounds to a water-based sol or a hydrophilic organic solvent sol of fluoride colloid particles, the surfaces of the fluoride colloid particles can be modified by coating with the organophosphorus compounds. The hydrophilic organic solvent sol of fluoride colloid particles can be obtained by substituting water that is a disperse medium of a water-based sol of fluoride colloid particles with a hydrophilic organic solvent.

A method for adding the organophosphorus compounds is not particularly limited. It is preferable to drip the organophosphorus compounds while stirring a water-based sol or a hydrophilic organic solvent sol of fluoride colloid particles with a stirrer. Although the temperature of the sol when dripping the organophosphorus compounds is not particularly limited, the temperature is, for example, 5 to 40° C., and preferably, 10 to 30° C.

Next, a solvent substitution of a sol of fluoride colloid particles will be described. The organosol of fluoride colloid particles of the present invention is separated into two cases. In one case the disperse medium is a hydrophilic organic solvent, and in the other case the disperse medium is a hydrophobic organic solvent. In the former case, the organosol of fluoride colloid particles of the present invention can be obtained by adding organophosphorus compounds to a water-based sol of fluoride colloid particles, and then by substituting water that is a disperse medium with a hydrophilic organic solvent, or by substituting water that is the disperse medium of the water-based sol with a hydrophilic organic solvent, and then adding organophosphorus compounds. In the latter case, the organosol of fluoride colloid particles of the present invention can be obtained by substituting the disperse medium of the organosol of a hydrophilic organic solvent of fluoride colloid particles with a hydrophobic organic solvent, and then by adding organophosphorus compounds, or by adding organophosphorus compounds to a water-based sol of fluoride colloid particles, and then substituting water that is a disperse medium with a hydrophobic organic solvent. The solvent substitution can be performed in a usual manner, for example, the solvent substitution can be performed under reduced pressure or normal pressure with an evaporator.

Examples of the organic solvent of the present invention include a ketone-based solvent, an alcohol-based solvent, an ether-based solvent, an ester-based solvent, a hydrocarbon-based solvent, and a halogen-based solvent. The organic solvents can be used individually or by mixing two or more types thereof as necessary. Specifically, the organosol of fluoride colloid particles of the present invention is useful in that it can use not only a hydrophilic organic solvent but also a hydrophobic organic solvent as a disperse medium. A hydrophilic organic solvent according to the present invention means an organic solvent having excellent compatibility with water, and includes linear or side chain lower alcohols having 1 to 6 carbon atom(s), such as methanol, ethanol, n-propanol, and iso-propanol; and glycols such as ethylene glycol, diethylene glycol, and propylene glycol. A hydrophobic organic solvent according to the present invention means an organic solvent that is hardly dissolved in water, and includes, for example, a ketone-based solvent such as methyl ethyl ketone, methyl isobutyl ketone, diethyl ketone, and cyclohexanone; a carbon hydride based solvent such as toluene, xylene, hexane, and solvent naphtha; an ester based solvent such as ethyl acetate, butyl acetate, and isobutyl acetate; and a halogen based solvent such as chloroform, carbon tetrachloride, and 1,2-dichloroethane.

Fluoride colloid particles in the organosol of fluoride colloid particles of the present invention have a primary particle diameter of 3 to 100 nm according to an observation through an electronic microscope. Since a film thickness effective as an antireflection film is 100 nm, it is not preferable that the primary particle diameter exceeds 100 nm.

The solid content concentration of the organosol of fluoride colloid particles of the present invention is 0.1 to 20% by mass, and preferably, 0.5 to 10% by mass. Although less than 0.1% by mass is also acceptable, it is not efficient in manufacture or in use. In addition, if the concentration exceeds 20% by mass, the viscosity becomes too high, so that it is not preferable.

The coating amount of the organophosphorus compounds in the organosol of fluoride colloid particles of the present invention is preferably, 0.1 to 50% by mass and more preferably, 5 to 30% by mass, based on the mass of the colloid particles. If the amount is less than 0.1% by mass, fluoride colloid particles are not dispersed in a colloidal form sufficiently. On the contrary, if the amount is more than 50% by mass, the organosol results in just containing excessive organophosphorus compounds, which is not economical and thus not preferable.

Next, a transparent composition for antireflection in which the organosol of fluoride colloid particles of the present invention is used, will be described. The organosol of fluoride colloid particles of the present invention can be used as a transparent composition for antireflection by using the organosol mixed with a silicon compound, active energy beam polymerizable methacrylate, resin emulsion, a water-soluble polymer liquid, silicone oil, a coating material, or the like.

Examples of the silicon compound include the following component A and/or component B.

Component A: an organosilicon compound represented by a general formula (I):

$(R^1)_a(R^3)_b Si(OR^2)_{4-(a+b)}$ (I)

(where $R^1$ and $R^3$ individually represent an organic group selected from a group consisting of an alkyl group, an alkenyl group, an aryl group, an acyl group, a halogen atom, a glycidoxy group, an epoxy group, an amino group, a phenyl group, a mercapto group, a methacryloxy group, and a cyano group; $R^2$ represents an organic group selected from a group consisting of an alkyl group, an alkoxy group, an acyl group, and a phenyl group having 1 to 8 carbon atom(s); and a and b are an integer of 0 or 1), or hydrolysate of the compound.

Component B: an organosilicon compound represented by a general formula (II):

$((OX)_{3-a}Si(R^4))_2 Y$ (II)

(where $R^4$ represents an organic group having 1 to 5 carbon atom(s); X represents an alkyl group having 1 to 4 carbon atom(s) or an acyl group having 1 to 4 carbon atom(s); Y represents an organic group having 2 to 20 carbon atoms; a is an integer of 0 or 1), or hydrolysate of the compound.

The component A is represented by the general formula (I). Specific examples of the organosilicon compound or hydrolysate thereof include methyl silicate, ethyl silicate, n-propyl silicate, iso-propyl silicate, n-butyl silicate, tetraacetoxysilane, methyltrimethoxysilane, methyltripropoxysilane, methyltriacetoxysilane, methyltributoxysilane, methyltripropoxysilane, methyltriamyloxysilane, methyltriphenoxysilane, methyltribenzyloxysilane, methyltriphenethyloxysilane, glycidoxymethyltrimethoxysilane, glycidoxymethyltrimethoxysilane, α-glycidoxyethyltrimethoxysilane, α-glycidoxytriethoxysilane, β-glycidoxytrimethoxysilane, β-glycidoxyethyltriethoxysilane, α-glycidoxypropyltrimethoxysilane, α-glycidoxypropyltriethoxysilane, β-glycidoxypropyltrimethoxysilane, β-glycidoxypropyltriethoxysilane, γ-glycidoxypropyltrimethoxysilane, γ-glycidoxypropyltriethoxysilane, γ-glycidoxypropyltripropoxysilane, γ-glycidoxypropyltributoxysilane, γ-glycidoxypropyltriphenoxysilane, α-glycidoxybutyltrimethoxysilane, α-glycidoxybutyltriethoxysilane, β-glycidoxybutyltriethoxysilane, γ-glycidoxybutyltrimethoxysilane, γ-glycidoxybutyltriethoxysilane, δ-glycidoxybutyltrimethoxysilane, δ-glycidoxybutyltriethoxysilane, (3,4-epoxycyclohexyl)methyltrimethoxysilane, (3,4-epoxycyclohexyl)methyltriethoxysilane, β-(3,4-epoxycyclohexyl)ethyltrimethoxysilane, β-(3,4-epoxycyclohexyl)ethyltriethoxysilane, β-(3,4-epoxycyclohexyl)ethyltripropoxysilane, β-(3,4-epoxycyclohexyl)ethyltributoxysilane, β-(3,4-epoxycyclohexyl)ethyltriphenoxysilane, γ-(3,4-epoxycyclohexyl)propyltrimethoxysilane, γ-(3,4-epoxycyclohexyl)propyltriethoxysilane, δ-(3,4-epoxycyclohexyl)butyltrimethoxysilane, δ-(3,4-epoxycyclohexyl)butyltriethoxysilane, glycidoxymethylmethyldimethoxysilane, glycidoxymethylmethyldiethoxysilane, α-glycidoxyethylmethyldimethoxysilane, α-glycidoxyethylmethyldiethoxysilane, β-glycidoxyethylmethyldimethoxysilane, β-glycidoxyethylmethyldiethoxysilane, α-glycidoxypropylmethyldimethoxysilane, α-glycidoxypropylmethyldiethoxysilane, β-glycidoxypropylmethyldimethoxysilane, β-glycidoxypropylethyldimethoxysilane, γ-glycidoxypropylmethyldimethoxysilane, γ-glycidoxypropylmethyldiethoxysilane, γ-glycidoxypropylmethyldipropoxysilane, γ-glycidoxypropylmethyldibutoxysilane, γ-glycidoxypropylmethyldiphenoxysilane, γ-glycidoxypropylethyldiethoxysilane, γ-glycidoxypropylethyldiethoxysilane, γ-glycidoxypropylvinylmethoxysilane, γ-glycidoxypropylvinylethoxysilane, γ-glycidoxypropylvinylphenylmethoxysilane, γ-glycidoxypropylvinylphenylethoxysilane, ethyltrimethoxysilane, ethyltriethoxysilane, vinyltrimethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-methacryloxypropyltrimethoxysilane, γ-mercaptopropyltrimethoxysilane, γ-mercaptopropyltriethoxysilane, β-cyanoethyltriethoxysilane, chloromethyltrimethoxysilane, chloromethyltriethoxysilane, N-(β-aminoethyl)γ-aminopropyltrimethoxysilane, N-(β-aminoethyl)γ-aminopropylmethyldimethoxysilane, γ-aminopropylmethyltrimethoxysilane, N-(β-aminoethyl)γ-aminopropyltriethoxysilane, N-(β-aminoethyl)γ-aminopropylmethyldiethoxysilane, dimethyldimethoxysilane, phenylmethyldimethoxysilane, dimethyldiethoxysilane, phenylmethyldiethoxysilane, γ-chloropropylmethyldimethoxysilane, γ-chloropropylmethyldiethoxysilane, dimethyldiacetoxysilane, γ-methacryloxypropylmethyldimethoxysilane, γ-methacryloxypropylmethyldiethoxysilane, γ-mercaptopropylmethyldimethoxysilane, γ-mercaptomethyldiethoxysilane, methylvinyldimethoxysilane, and methylvinyldiethoxysilane, and hydrolysates thereof.

Next, the component B will be described. The component B is represented by the general formula (II). Specific examples of the organosilicon compound or hydrolysate thereof include methylene bismethyldimethoxy silane, ethylene bisethyldimethoxy silane, propylene bisethyldiethoxy silane, and butylene bismethyldiethoxy silane, and hydrolysates thereof.

In the organosilicon compound of the component A, the component A or the component B can be used individually, or by mixing the component A and the component B. In addition, as is obvious, it is possible to use two or more types of the component A, or to use two or more types of the component B.

The hydrolysis of the organosilicon compound of the component A or the component B is performed by adding an acid aqueous solution such as a hydrochloric acid aqueous solution, a sulfuric acid aqueous solution, or an acetic acid aqueous solution in the organosilicon compound of the component A or the component B, and by stirring the mixture.

The active energy beam polymerizable methacrylate can be selected from any ultraviolet or electron beam curable methacrylate having one or more methacryloyl. groups in the molecule and can be used individually or by mixing such methacrylates. Specific examples of the methacrylate include, but are not limited to, 2-hydroxyethylmethacrylate, 2-hydroxypropylmethacrylate, isobutylmethacrylate, t-butylmethacrylate, isobutylmethacrylate, 2-ethylhexylmethacrylate, stearylacrylate, 2-ethylhexylcarbitolacrylate, ω-carboxypolycaprolactonemonoacrylate, acryloyloxy ethyl acid, acrylic acid dimer, laurylmethacrylate, 2-methoxyethylacrylate, butoxyethylacrylate, ethoxyethoxyethylacrylate, methoxytriethyleneglycolacrylate, methoxypolyethyleneglycolacrylate, stearylmethacrylate, cyclohexylmethacrylate, tetrahydrofurfurylmethacrylate, N-vinyl-2-pyrolidone, isobonylmethacrylate, dicyclopentenyl acrylate, benzil acrylate, phenyl glycidyl ether epoxy acrylate, phenoxyethyl methacrylate, phenoxypolyethylene glycol acrylate, nonyl phenol ethoxylated acrylate, acryloyloxy ethyl phthalic acid, tribromophenyl acrylate, tribromophenol ethoxylated methacrylate, methyl methacrylate, tribromophenyl methacrylate, methacryloyloxy ethyl acid, methacryloyloxy ethyl maleic acid, methacryloyloxy ethyl phthalic acid, polyethyleneglycol methacrylate, polypropyleneglycol methacrylate, β-carboxyethyl acrylate, N-methylol acrylamide, N-methoxy methyl acrylamide, N-ethoxymethyl acrylamide, N-n-butoxymethyl acrylamide, t-butyl acrylamide sulfonic acid, vinyl stearylate, N-methyl acrylamide, N-dimethyl acrylamide, N-dimethylaminoethyl metacrylate, N-dimethylaminopropyl acrylamide, acryloyl morpholine, glycidyl metacrylate, n-butyl metacrylate, ethyl metacrylate, alyl metacrylate, cetyl metacrylate, pentadecyl metacrylate, methoxypolyethylene glycol metacrylate, diethylaminoethyl metacrylate, methacroyloxyethyl succinic acid, hexanediol diacrylate, neopentylglycol diacrylate, triethyleneglycol diacrylate, polyethyleneglycol diacrylate, polypropyleneglycol diacrylate, neopentyl hydroxypivalic acid ester, pentaerythritol diacrylate monostearate, glycol diacrylate, 2-hydroxyethyl metacryloyl phosphate, bis-phenol-A ethylene glycol-added acrylate, bis-phenol-F ethylene glycol-added acrylate, tricyclodecane methanol diacrylate, tris-hydroxyethyl isocyanulate diacrylate, 2-hydroxy-1-acryloxy-3-methacryloxy propane, trimethylol propane triacrylate, trimethylol propane ethylene glycol-added triacrylate, trimethylol propane propylene glycol-added triacrylate, pentaerythritol triacrylate, tris-acryloyloxyethyl phosphate, tris-hydroxyethylisocyanulate triacrylate, denatured ε-caprolactone triacrylate, trimethylolpropane ethoxy triacrylate, glycerin propylene glycol-added tris-acrylate, pentaerythritol tetraacrylate, pentaerythritol ethylene glycol-added tetraacrylate, ditrimethylol propane tetraacrylate, dipentaerythritol hexa-penta acrylate, dipentaerythritol monohydroxy penta acrylate, urethane acrylate, epoxy acrylate, polyester acrylate, and unsaturated polyester. These methacrylates can be used individually or by optionally mixing them. Preferably, a polyfunctional methacrylate monomer or oligomer containing two or more methacryloyl groups in the molecule is preferable, because the film after polymerization is hard and has good abrasion-resistance.

In an antireflection film formed on the surface of a base material with a transparent composition for antireflection in which the organosol of fluoride colloid particles of the present invention is used, the film thickness thereof is generally controlled from 0.01 to 0.5 μm. Specifically, when an optical film thickness is controlled to be approximately 0.1 μm, good antireflective properties are obtained. Examples of a method for coating the surface of the base material with the transparent composition for antireflection include, but are not limited to, a dipping method, a spin coating method, a flow coating method, a roll coating method, a spray coating method, and a screen printing method. However, it is preferable to control a film thickness so as to be a predetermined film thickness by the dipping method, a spray method, and the roll coating method since the film thickness can be easily controlled.

The transparent composition for antireflection in which the organosol of fluoride colloid particles of the present invention is used, is applied on a transparent base material made of synthetic resin. As specific examples of the synthetic resin, any synthetic resin is applicable so long as the resin has excellent optical properties. Specific examples of the synthetic resin can include, but are not limited to, a polycarbonate based resin; a polyalkylene terephthalate resin such as polyethylene terephthalate (PET); a cellulosic resin such as diacetyl cellulose, acetate butyrate cellulose, and triacetyl cellulose; an acryl based resin; a polystyrene based resin; a polyimide resin; a polyester resin; a polyether sulfone resin; a liquid-crystalline resin such as polyallirate; a polyurethane resin; a polysulfone resin; a polyetherketone resin; a polyolefin resin such as trimethylpentene and polyvinylnorbomene; and composite resins thereof. The transparent base material may be a formed part, or have a plate-like form or a film-like form. The film-like form is more preferable due to the easiness of coating activity.

EXAMPLES

Reference Example 1

Step (A): 2436 g (1125 g as $MgCl_2$) of magnesium chloride ($MgCl_2.6H_2O$, special grade chemicals, manufactured by Koso Chemical Co., Ltd.) was dissolved in 40 kg of purified water to prepare 42.4 kg of an aqueous solution of magnesium chloride. The concentration of $MgCl_2$ in the aqueous solution was 2.65% by mass. Meanwhile, 685 g of ammonium hydrogenfluoride ($NH_4F.HF$, special grade chemicals, manufactured by Morita Chemical Industries Co., Ltd.) was dissolved in 40 kg of purified water, and then 730 g of 28% ammonia water (reagent, manufactured by Koso Chemical Co., Ltd.) was added to prepare 41.4 kg (867 g as $NH_4F$) of an ammonium fluoride aqueous solution. The concentration of $NH_4F$ in the aqueous solution was 2.09% by mass. 42.4 kg of the above aqueous solution of magnesium chloride was charged into a 200-L vessel, and 41.4 kg of the above ammonium fluoride aqueous solution was added while strongly stirring with a disperser at room temperature over 30 minutes. Subsequently, the stirring was further continued for 1 hour to obtain 83.8 kg of slurry of colloid particles of magnesium fluoride hydrate. The ratio of fluorine and magnesium in the magnesium chloride and ammonium fluoride was 1.98 as an F/Mg molar ratio. The slurry of colloid particles of the obtained magnesium fluoride hydrate exhibited such a tendency that part of the slurry was subjecting to sedimentation separation by settling. The colloid particles of this magnesium fluoride hydrate formed aggregates. The slurry had the following properties: a pH of 7.07, a conductivity of 40 mS/cm, and a concentration of magnesium fluoride hydrate of 0.87% by mass as $MgF_2$. A salt that was obtained as a by-product was ammonium chloride, and the mass of the ammonium chloride in the slurry was 1.51% by mass.

Step (B): Filtering and washing were performed while adding 270 kg of purified water to 83.8 kg of the slurry of colloid particles of the magnesium fluoride hydrate obtained in Step (A) at the same rate as an ultrafiltration rate, with a tubular ultrafiltration device (UF(PS-150), manufactured by Mitsubishi Rayon Engineering Co., Ltd.). The liquid temperature of the slurry during the filtering and washing was 25° C., and the time for filtering was 15.5 hours. A solid content concentration after the filtering and washing was 2.5% by mass as $MgF_2$. Furthermore, the slurry was concentrated by an ultrafiltration device to obtain 12.74 kg of a water-based sol of magnesium fluoride hydrate.

The obtained water-based sol had the following properties: a specific gravity of 1.042, a concentration of magnesium fluoride hydrate of 5.9% by mass, a pH of 7.10, a viscosity of 1.8 mPa·s, a conductivity of 355 μS/cm, and a yield of magnesium fluoride hydrate of 91%.

Step (C): A solvent substitution was performed while adding approximately 20 L of methanol continuously to 726 g of the water-based sol under reduced pressure with a rotary evaporator to obtain 428 g of a methanol sol of magnesium fluoride hydrate. The obtained methanol sol had the following properties: a specific gravity of 0.85, a concentration of magnesium fluoride hydrate ($MgF_2 \cdot 0.4H_2O$) of 10.0% by mass, a primary particle diameter according to an observation through an electronic microscope of 20 to 40 nm, a pH, when measured by diluting the sol with water having the same mass as the sol, of 5.8, a viscosity of 1.0 mPa s, and a water content of 0.7% by mass.

Reference Example 2

Step (A): 2268 g of sodium fluoride (NaF, special grade chemicals, manufactured by Kanto Chemical Co.,Inc.) was dissolved in 100 L of purified water to prepare 102.3 kg of a sodium fluoride aqueous solution. The concentration of sodium fluoride in the aqueous solution was 2.22% by mass. Meanwhile, 3654 g of magnesium chloride ($MgCl_2 \cdot 6H_2O$, special grade chemicals, manufactured by Koso Chemical Co., Ltd.) was dissolved in 100 L of purified water to prepare 103.7 kg of a magnesium chloride aqueous solution. The concentration of magnesium chloride ($MgCl_2$) in the aqueous solution was 1.65% by mass.

102.3 kg of the above sodium fluoride aqueous solution was charged into a 300-L vessel, and while strongly stirring the aqueous solution with a disperser, 103.7 kg of the above magnesium chloride aqueous solution was added to the sodium fluoride aqueous solution at room temperature over 30 minutes. Subsequently, the stirring was further continued for 1 hour to obtain 206 kg of slurry of colloid particles of sodium magnesium fluoride. The obtained slurry of colloid particles of sodium magnesium fluoride partly became a sol. However, the slurry was sedimented by settling, and the colloid particles of sodium magnesium fluoride formed aggregates. The concentration of sodium magnesium fluoride in the slurry was 0.91% by mass. In addition, the slurry had a pH of 4.43 and a conductivity of 16.0 mS/cm.

Step (B): Filtering and washing were performed while adding 420 kg of purified water to 206 kg of the aggregate slurry of colloid particles of sodium magnesium fluoride obtained in Step (A) at the same rate as an ultrafiltration rate, with a tubular ultrafiltration device (UF(PS-150), manufactured by Mitsubishi Rayon Engineering Co., Ltd.). The liquid temperature of the slurry during the filtering and washing was 25° C., and the time for filtering was 15.5 hours. A concentration after the filtering and washing was approximately 3.0% by mass as $NaF \cdot MgF_2$. Furthermore, the slurry was concentrated by an ultrafiltration device to obtain 6170 g of aggregate slurry of colloid particles of sodium magnesium fluoride substantially containing no salts. The aggregate slurry of colloid particles of sodium magnesium fluoride obtained in Step (B) had a concentration of sodium magnesium fluoride ($NaF \cdot MgF_2$) of 28.0% by mass, and a conductivity of 870 µS/cm. Aggregates of colloid particles of sodium magnesium fluoride were sedimented by settling. A yield of sodium magnesium fluoride was approximately 92%.

Step (C): 500 g of glass beads (φ 1.5 mm, made of soda-lime glass) was added to 670 g of the aggregate slurry of colloid particles of the sodium magnesium fluoride substantially containing no salts obtained in Step (B). Then, the resultant mixture was pulverized while cooling with a rotation of 2000 rpm using a batch type sand grinder for 4 hours at room temperature. After the pulverization, the glass beads were removed to obtain 1250 g of a water-based sol of sodium magnesium fluoride. The concentration of the water-based sol of sodium magnesium fluoride was lower than that of the water-based sol before the pulverization due to washing the glass beads with purified water. The water-based sol of sodium magnesium fluoride had the following properties: a specific gravity of 1.106, a concentration of sodium magnesium fluoride ($NaF \cdot MgF_2$) of 15.0% by mass, a primary particle diameter according to an observation through an electronic microscope of 40 to 50 nm, a pH of 7.05, a viscosity of 3.8 mPa·s, and a conductivity of 492 µS/cm. Deposits were slightly recognized in the sol by settling at room temperature for 1 month, however the sol was stable. In addition, a particle diameter in liquid using a dynamic light scattering method was 204 nm. The particle diameter using a dynamic light scattering method was measured by a commercially available $N_4$ device manufactured by Beckman Coulter, Inc., the United States.

Example 1

2.8 g of phenylphosphonic acid (manufactured by Nissan Chemical Industries, Ltd.) was added to 315 g of the water-based sol of magnesium fluoride hydrate obtained in Step (B) of Reference Example 1, and the resultant mixture was mixed to obtain a water-based sol of colloid particles of modified magnesium fluoride surface-treated with phenylphosphonic acid. By a method for distilling water away while adding approximately 8 L of methanol little by little to the obtained water-based sol of colloid particles of modified magnesium fluoride with a rotary evaporator, a water medium was substituted with methanol to obtain 192 g of a methanol sol of modified magnesium fluoride hydrate. The obtained sol had the following properties: a specific gravity of 0.84, a pH, when measured by diluting the sol with water having the same mass as the sol, of 2.5, a viscosity of 1.0 mPa·s, a water content of 1.1% by mass, and a concentration of magnesium fluoride hydrate of 9.8% by mass. Next, by a method for distilling methanol away while adding approximately 700 mL of methyl ethyl ketone little by little to 180 g of the obtained methanol sol with a rotary evaporator, a methanol medium was substituted with methyl ethyl ketone to obtain a methyl ethyl ketone sol of modified magnesium fluoride hydrate. The obtained sol had the following properties: a specific gravity of 0.86, a concentration of magnesium fluoride hydrate of 9.5% by mass, a viscosity of 1.0 mPa·s, a primary particle diameter according to an observation through an electronic microscope of 20 to 40 nm, a content of phenylphosphonic acid based on the mass of colloid particles of magnesium fluoride hydrate of 15.0% by mass, and a color difference measured by a color-difference meter (TOPSCAN MODEL TC-1800MKII manufactured by Tokyo Denshoku Co., Ltd.) of L 92, a −1.0, and b 11.

Example 2

2.9 g of phenylphosphonic acid (manufactured by Nissan Chemical Industries, Ltd.) was added to 190 g of the methanol sol of colloid particles of magnesium fluoride hydrate obtained in Step (C) of Reference Example 1, and the resultant mixture was mixed to obtain a methanol sol of colloid particles of modified magnesium fluoride surface-treated with phenylphosphonic acid. By a method for distilling methanol away while adding approximately 500 mL of methyl ethyl ketone little by little to the obtained methanol sol of colloid particles of modified magnesium fluoride with a rotary evaporator, a methanol medium was substituted with methyl ethyl ketone to obtain a methyl ethyl ketone sol of modified magnesium fluoride hydrate. The obtained sol had the following properties: a specific gravity of 0.86, a concentration of magnesium fluoride hydrate of 10.0% by mass, a viscosity of 1.0 mPa·s, a primary particle diameter according to an observation through an electronic microscope of 20 to 40 nm, a content of phenylphosphonic acid based on the mass of colloid particles of magnesium fluoride hydrate of 15.3% by mass, and a color difference measured by a color-difference meter (TOPSCAN MODEL TC-1800MKII manufactured by Tokyo Denshoku Co., Ltd.) of L 94, a –1.2, and b. 9.5.

Example 3

A solvent substitution was performed while adding approximately 5 L of methanol continuously to 267 g of the water-based sol of sodium magnesium fluoride obtained in Step C of Reference Example 2 under reduced pressure with a rotary evaporator to obtain 400 g of a methanol sol of sodium magnesium fluoride. The obtained methanol sol had the following properties: a specific gravity of 0.87, a concentration of sodium magnesium fluoride of 10.0% by mass, a pH, when measured by diluting the sol with water having the same mass as the sol, of 7.1, a viscosity of 1.0 mPa·s, and a water content of 1.5% by mass. 2.5 g of phenylphosphonic acid was added to 167 g of the above methanol sol of sodium magnesium fluoride, and the resultant mixture was mixed to obtain a methanol sol of modified sodium magnesium fluoride surface-treated with phenylphosphonic acid. A solvent substitution was performed while adding approximately 1 L of methyl ethyl ketone intermittently to 169 g of the methanol sol of modified sodium magnesium fluoride under reduced pressure with a rotary evaporator to obtain 167 g of a methyl ethyl ketone sol of sodium magnesium fluoride. The obtained sol had the following properties: a specific gravity of 0.88, a concentration of sodium magnesium fluoride of 10.0% by mass, a viscosity of 1.0 mPa·s, a primary particle diameter according to an observation through an electronic microscope of 40 to 50 nm, a content of phenylphosphonic acid based on the mass of colloid particles of sodium magnesium fluoride of 15.0% by mass, and a color difference measured by a color-difference meter (TOPSCAN MODEL TC-1800MKII manufactured by Tokyo Denshoku Co., Ltd.) of L 89, a –1.1, and b 14.5.

Example 4

1.9 g of monobutyl phosphate (MP-4, manufactured by Daihachi Chemical Industry Co., Ltd.) was added to 125 g of the methanol sol of colloid particles of magnesium fluoride hydrate obtained in Step (C) of Reference Example 1, and the resultant mixture was mixed to obtain a methanol sol of colloid particles of modified magnesium fluoride hydrate surface-treated with monobutyl phosphate. A pH when measured by diluting the sol with water having the same mass as the sol was 2.4. By a method for distilling methanol away while adding approximately 500 mL of methyl ethyl ketone little by little to 126 g of the obtained methanol sol of colloid particles of modified magnesium fluoride hydrate with a rotary evaporator, a methanol medium was substituted with methyl ethyl ketone to obtain 124 g of a methyl ethyl ketone sol of modified magnesium fluoride hydrate. The obtained sol had the following properties: a specific gravity of 0.86, a concentration of magnesium fluoride hydrate of 10.0% by mass, a viscosity of 1.0 mPa·s, a primary particle diameter according to an observation through an electronic microscope of 20 to 40 nm, a content of monobutyl phosphate based on the mass of colloid particles of magnesium fluoride hydrate of 15.2% by mass, and a color difference measured by a color-difference meter (TOPSCAN MODEL TC-1800MKII manufactured by Tokyo Denshoku Co., Ltd.) of L 96, a –0.17, and b 5.2.

Example 5

1.7 g of dibutyl phosphate (DP-4, manufactured by Daihachi Chemical Industry Co., Ltd.) was added to 116 g of the methanol sol of colloid particles of magnesium fluoride hydrate obtained in Step (C) of Reference Example 1, and the resultant mixture was mixed to obtain a methanol sol of colloid particles of modified magnesium fluoride hydrate surface-treated with dibutyl phosphate. A pH when measured by diluting the sol with water having the same mass as the sol was 2.4. By a method for distilling methanol away while adding approximately 500 mL of methyl ethyl ketone little by little to 117 g of the obtained methanol sol of colloid particles of modified magnesium fluoride hydrate with a rotary evaporator, a methanol medium was substituted with methyl ethyl ketone to obtain 116 g of a methyl ethyl ketone sol of modified magnesium fluoride hydrate. The obtained sol had the following properties: a specific gravity of 0.86, a concentration of magnesium fluoride hydrate of 9.9% by mass, a viscosity of 1.0 mPa·s, a primary particle diameter according to an observation through an electronic microscope of 20 to 40 nm, a content of dibutyl phosphate based on the mass of colloid particles of magnesium fluoride hydrate of 14.7% by mass, and a color difference measured by a color-difference meter (TOPSCAN MODEL TC-1800MKII manufactured by Tokyo Denshoku Co., Ltd.) of L99, a –0.21, and b 2.0.

Example 6

1.9 g of phenylphosphinic acid (manufactured by Fluorochem Ltd.) was added to 127 g of the methanol sol of colloid particles of magnesium fluoride hydrate obtained in Step (C) of Reference Example 1, and the resultant mixture was mixed to obtain a methanol sol of colloid particles of modified magnesium fluoride hydrate surface-treated with phenylphosphinic acid. A pH when measured by diluting the sol with water having the same mass as the sol was 2.2. By a method for distilling methanol away while adding approximately 500 mL of methyl ethyl ketone little by little to 128 g of the obtained methanol sol of colloid particles of modified magnesium fluoride with a rotary evaporator, a methanol medium was substituted with methyl ethyl ketone to obtain 124 g of a methyl ethyl ketone sol of modified magnesium fluoride hydrate. The obtained sol had the following properties: a specific gravity of 0.86, a concentration of magnesium fluoride hydrate of 10.2% by mass, a viscosity of 1.0 mpa·s, a primary particle diameter according to an observation through an electronic microscope of 20 to 40 nm, a content of phenylphosphinic acid based on the mass of colloid particles of magnesium fluoride hydrate of 15.0% by mass, and a color difference measured by a color-difference meter (TOPSCAN MODEL TC-1800MKII manufactured by Tokyo Denshoku Co., Ltd.) of L 95, a –0.62, and b 6.7.

Example 7

2.5 g of phenylphosphinic acid (manufactured by Nissan Chemical Industries, Ltd.) was added to 124 g of the methanol sol of colloid particles of magnesium fluoride hydrate obtained in Step (C) of Reference Example 1, and the resultant mixture was mixed to obtain a methanol sol of colloid particles of modified magnesium fluoride surface-treated with phenylphosphinic acid. By a method for distilling methanol away while adding approximately 500 mL of propylene glycol monomethyl ether little by little to the obtained methanol sol of colloid particles of modified magnesium fluoride with a rotary evaporator, a methanol medium was substituted with propylene glycol monoethyl ether to obtain a propylene glycol monoethyl ether sol of modified magnesium fluoride hydrate. The obtained sol had the following properties: a specific gravity of 0.98, a concentration of magnesium fluoride hydrate of 10.2% by mass, a viscosity of 2.4 mPa·s, a primary particle diameter according to an observation through an electronic microscope of 20 to 40 nm, a content of phenylphosphinic acid based on the mass of colloid particles of magnesium fluoride hydrate of 20.8% by mass, and a color difference measured by a color-difference meter (TOPSCAN MODEL TC-1800MKII manufactured by Tokyo Denshoku Co., Ltd.) of L 99, a −0.1, and b 1.4.

Comparative Example 1

By a method for distilling methanol away while adding methyl ethyl ketone little by little to 150 g of the methanol sol of colloid particles of magnesium fluoride obtained in Step (C) of Reference Example 1 with a rotary evaporator, a methanol medium was substituted with methyl ethyl ketone. At the point of adding approximately 300 mL of methyl ethyl ketone, the transparency of the sol was lowered and the sol turned into a gel.

INDUSTRIAL APPLICABILITY

An organosol of fluoride colloid particles of the present invention can be used as a coating material such as transparent composition for antireflection by using the organosol mixed with a silicon compound, active energy beam polymerizable methacrylate, resin emulsion, a water-soluble polymer liquid, silicone oil, a coating material, or the like.

The invention claimed is:

1. An organosol of a surface-modified fluoride colloid particle comprising:
    an organic solvent;
    a fluoride colloid particle having a primary particle diameter of 3 to 100 nm according to an observation through an electronic microscope as a core; and
    at least one type of an organophosphorus compound selected from a group consisting of phenylphosphonic acid, an alkali metal salt of the phenylphosphonic acid, and an ammonium salt of the phenylphosphonic acid, the organophosphorus compound coating a surface of the fluoride colloid particle.

2. The organosol of a fluoride colloid particle according to claim 1, wherein a coating amount of the organophosphorus compound is 0.1 to 50% by mass based on a mass of the fluoride colloid particle.

3. The organosol of a fluoride colloid particle according to claim 1, wherein the fluoride colloid particle is magnesium fluoride, sodium magnesium fluoride, or a hydrate salt of the magnesium fluoride or the sodium magnesium fluoride.

4. The organosol of a fluoride colloid particle according to claim 1, wherein the organic solvent is a hydrophobic organic solvent.

5. A method for producing the organosol of a fluoride colloid particle as claimed in claim 1, the method comprising:
    mixing a sol of a fluoride colloid particle with an organophosphorus compound.

6. The method for producing an organosol of a fluoride colloid particle according to claim 5, the method further comprising the following steps of (a), (b), and (c):
    (a) producing a water-based sol of a fluoride colloid;
    (b) substituting an aqueous solvent of the water-based sol of a fluoride colloid with a hydrophilic organic solvent; and
    (c) substituting a solvent of a hydrophilic organic solvent sol of a fluoride colloid with a hydrophobic organic solvent; wherein during at least one step, at least one type of an organophosphorus compound selected from a group consisting of phenylphosphonic acid, an alkali metal salt of the phenylphosphonic acid, and an ammonium salt of the phenylphosphonic acid, is added.

\* \* \* \* \*